(12) United States Patent
Chen

(10) Patent No.: US 7,791,850 B2
(45) Date of Patent: Sep. 7, 2010

(54) GROUND FAULT CIRCUIT INTERRUPTER CONTROL CIRCUIT

(76) Inventor: Jingzheng Chen, No. 21-23 Gonghang Road, Qian'an, Beibaixiang, Yueqing City, Zhejiang (CN) 325603

( * ) Notice: Subject to any disclaimer, the term of this patent is extended or adjusted under 35 U.S.C. 154(b) by 288 days.

(21) Appl. No.: 12/009,069

(22) Filed: Jan. 16, 2008

(65) Prior Publication Data

US 2009/0180221 A1 Jul. 16, 2009

(51) Int. Cl.
*H02H 3/00* (2006.01)
*H02H 9/08* (2006.01)
(52) U.S. Cl. ............................................ 361/42
(58) Field of Classification Search .............. 361/42; 340/635, 638; 324/424
See application file for complete search history.

(56) References Cited

U.S. PATENT DOCUMENTS 5,173,673 A * 12/1992 Weigand et al. ............. 335/18
5,418,678 A * 5/1995 McDonald .................... 361/46
5,459,630 A * 10/1995 MacKenzie et al. ........... 361/45
5,943,199 A * 8/1999 Aromin ....................... 361/42
6,052,266 A * 4/2000 Aromin ....................... 361/49
6,195,241 B1 * 2/2001 Brooks et al. ................. 361/42
7,535,371 B2 * 5/2009 Wang ......................... 340/638
2007/0285267 A1 * 12/2007 Wang ......................... 340/638

* cited by examiner

*Primary Examiner*—Ronald W Leja
(74) *Attorney, Agent, or Firm*—Cohen Pontani Lieberman & Pavane LLP

(57) ABSTRACT

A ground fault circuit interrupter (GFCI) control circuit for providing an indicator or trip at the end of life. A GFCI with a monitor circuit added, in addition to common functions, is intended to automatically detect and indicate an abnormity of the circuit. Once any abnormity occurs to the elemental parts, the control circuit will indicate the malfunction or trip directly and stop the flow of electricity.

4 Claims, 1 Drawing Sheet

GROUND FAULT CIRCUIT INTERRUPTER CONTROL CIRCUIT

BACKGROUND OF THE INVENTION

1. Field of the Invention

The present invention relates to a ground fault circuit interrupter (GFCI) control circuit, which is intended to give an indicator or trip at the end of life.

2. Description of the Related Art

Conventional ground fault circuit interrupters (GFCIs) trip only in the event of a ground fault and are incapable of detecting a malfunction of the circuits themselves. Thus, GFCIs will not trip against the unwanted affects of electric leakage if the circuits themselves are damaged, thus putting people and property in danger.

SUMMARY OF THE INVENTION

In view of the above, an object of the present invention is to provide a ground fault circuit interrupter (GFCI) control circuit with a life-end indicator, which will give an indictor in advance of failure of the GFCIs or trip the GFCI directly in the event of an abnormity.

A technical solution in accordance with an embodiment of the present invention for solving its technical problem is as follows:

main input lines 1H and 2N pass through an inductor L1; a capacitor C1 and a capacitor C2 are connected in serial and then connected in parallel with the inductor L1; a common node between the capacitor C1 and the capacitor C2 is connected to a negative end of a power supply via a resistor R5; one end of the inductor L1 is connected to a pin 1 of a Single-Chip Microcomputer (SCM) IC1 via a capacitor C5 and a resistor R6 connected in serial, and the other end of the inductor L1 is connected to a pin 3 of the SCM IC1 for detecting electric leakage; a pin 5 of the SCM IC1 is connected to a resistor R14 and connected to ground via a capacitor C10, for driving a silicon controlled rectifier SCR2; the silicon controlled rectifier SCR2 is connected in serial with diodes D5, D6, D7 and D8 and a tripping relay RELAY-2; a power pin 6 of the SCM IC1 is connected to a resistor R11 and a cathode of a Zener diode D3; an anode of the Zener diode D3 is connected to an anode of a diode D9 in serial; a cathode of the diode D9 is connected to ground via an anode of a light-emitting diode D2; the power pin 6 of the SCM IC1 is connected to a cathode of a Zener diode D10; an anode of the Zener diode D10 is connected in serial with a resistor R13; another end of the resistor R13 is connected to a base of a transistor Q1, whose emitter is connected to the negative end of the power supply and the collector is connected to the anode of the light-emitting diode D2 via a resistor R10; a reset circuit is connected to the main power supply and connected in serial with S2 via a capacitor C7 and a resistor R8 connected in parallel; another end of S2 is connected to a control pin of a silicon controlled rectifier SCR1; the control pin of the silicon controlled rectifier SCR1 is connected in parallel with a resistor R9 and a capacitor C6 to form an instant trigger circuit; the silicon controlled rectifier SCR1 is connected with a self-holding relay RELAY-1.

An anode of the silicon controlled rectifier SCR2 is connected to a positive end of a bridge rectifier comprising the diodes D5, D6, D7 and D8; a cathode of the silicon controlled rectifier SCR2 is connected to a negative end of the bridge rectifier comprising the diodes D5, D6, D7 and D8; an AC input of the rectifying bridge is connected in serial with the tripping relay RELAY-2; another end of the tripping relay RELAY-2 is connected to a phase line of the power supply.

An end of an output phase line is connected with an anode of a light-emitting diode D1; a cathode of the light-emitting diode D1 is connected in serial with a resistor R4; another end of the resistor R4 is connected to an anode of a diode D4; a cathode of the diode D4 is connected to a neutral power supply line.

The control circuit of the present invention provides the following advantages. In normal cases, the control circuit can trip reliably upon occurrence of electric leakage. In case of standby, i.e. when no electric leakage occurs, if the GFCI itself encounters an abnormity, the control circuit can generate an indication with the light-emitting diodes so that people can discover the abnormity as soon as possible, or the control circuit can directly trip, in order to reduce occurrences of accidents that may cause injury or death or damage to equipment, due to failure of tripping upon occurrence of electric leakage caused by the malfunction of the GFCI itself.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
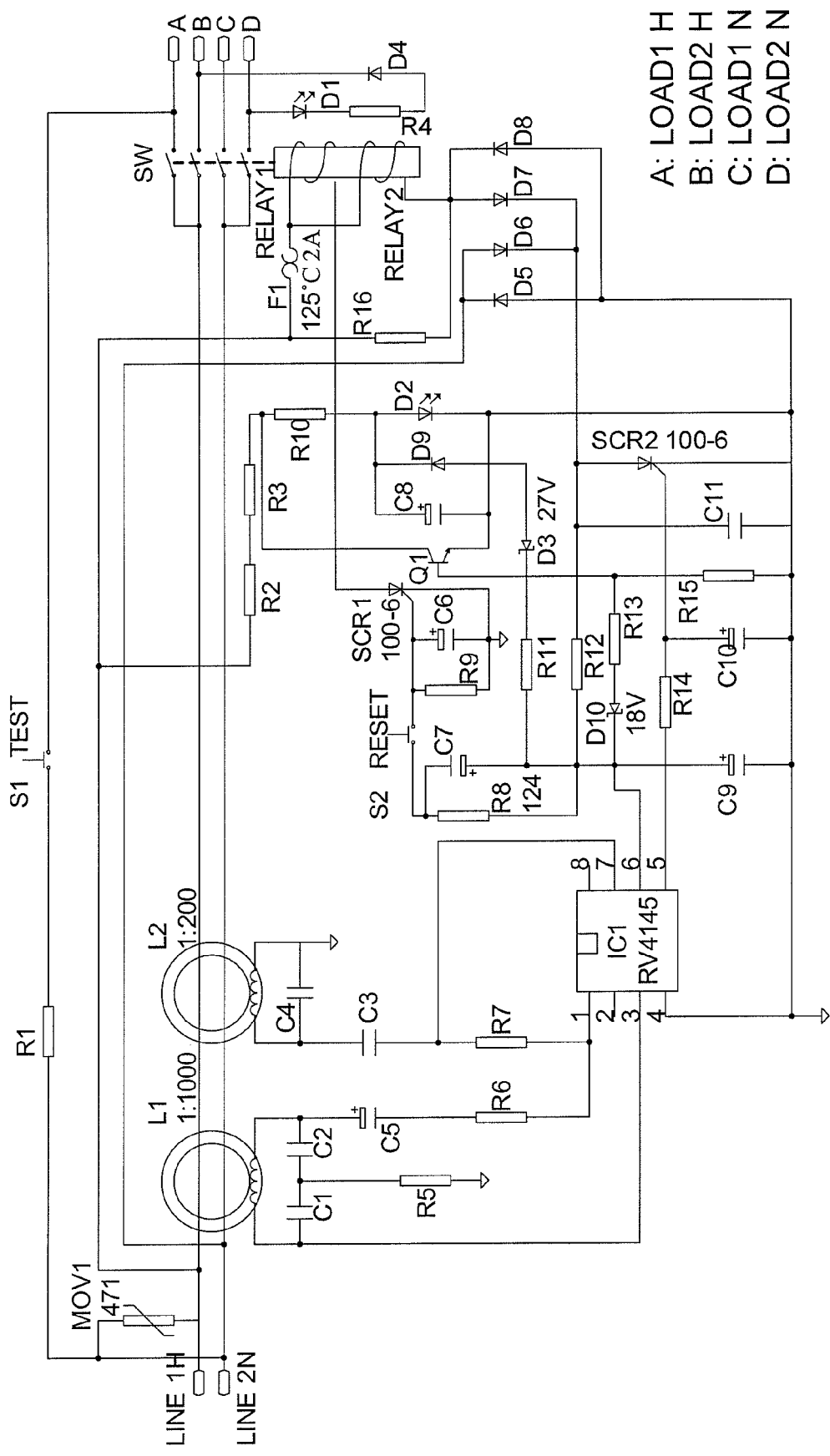
FIG. 1 is a principle diagram showing a circuit according to an embodiment of the present invention.

As shown in FIG. 1, according to the present invention, main input lines 1H and 2N pass through an inductor L1. A capacitor C1 and a capacitor C2 are connected in serial and then connected in parallel with the inductor L1. A common node between the capacitor C1 and the capacitor C2 is connected to a negative end of a power supply via a resistor R5. One end of the inductor L1 is connected to a pin 1 of a Single-Chip Microcomputer (referred to as "SCM" hereinafter) IC1 via a capacitor C5 and a resistor R6 connected in serial. The SCM IC1 may be, for example, RV4145 or 54123. The other end of the inductor L1 is connected to a pin 3 of the SCM IC1 for detecting electric leakage. A pin 5 of the SCM IC1 is connected to a resistor R14 and connected to ground via C10, for driving a silicon controlled rectifier SCR2. The silicon controlled rectifier SCR2 is connected in serial with diodes D5, D6, D7 and D8 and a tripping relay RELAY-2. A power pin 6 of the SCM IC1 is connected to a resistor R11 and a cathode of a Zener diode D3. An anode of the Zener diode D3 is connected to an anode of a diode D9 in serial. A cathode of the diode D9 is connected to ground via an anode of a light-emitting diode D2. The power pin 6 of the SCM IC1 is connected to a cathode of a Zener diode D10. An anode of the Zener diode D10 is connected in serial with a resistor R13. The other end of the resistor R13 is connected to a base of a transistor Q1, whose emitter is connected to the negative end of the power supply and collector is connected to the anode of the light-emitting diode D2 via a resistor R10. A reset circuit is connected to the main power supply and connected in serial with S2 via a capacitor C7 and a resistor R8 connected in parallel. Another end of S2 is connected to a control pin of a silicon controlled rectifier SCR1. The control pin of the silicon controlled rectifier SCR1 is connected in parallel with a resistor R9 and a capacitor C6 to form an instant trigger circuit. The silicon controlled rectifier SCR1 is connected with a self-holding relay RELAY-1. An anode of the silicon controlled rectifier SCR2 is connected to a positive end of a bridge rectifier consisting of the diodes D5, D6, D7 and D8. A cathode of the silicon controlled rectifier SCR2 is connected to a negative end of the bridge rectifier consisting of the diodes D5, D6, D7 and D8. An AC input of the rectifying bridge is connected in serial with the tripping relay RELAY-2. The other end of the tripping relay RELAY-2 is connected to a phase line of the power supply. An end of an output phase line is connected with an anode of a light-emitting diode D1. A cathode of the light-emitting diode D1 is connected in serial with a resistor R4. The other end of the resistor R4 is connected to an anode of a diode D4. A cathode of the diode D4 is connected to a neutral power supply line.

In connecting, an AC power supply is delivered via connection terminals and the two main input lines 1H and 2N that pass through the inductors L1 and L2, controlled by a main contact, and then provided to loads via output terminals. In case of standby, the input line 1H, a fuse F1, the coil RELAY-2, the diodes D5, D6, D7 and D8 for rectifying, and 2N constitute a loop for outputting a DC power supply, the voltage of which is reduced by a resistor R12 and then supplied to the IC1. The inductors L1 and L2, the resistors R6 and R7, the capacitors C1, C2, C3, C4 and C5, and IC1 together constitute an electric leakage detection circuit. Upon the occurrence of electric leakage, an inductive current will be generated in L1, causing variations at the input terminals 1 and 3 of IC1 and generating an output at the pin 5, such that the silicon controlled rectifier SCR2 is driven to power the tripping coil RELAY-2, and the main contact is disconnected.

An abnormity monitoring circuit includes four parts: 1) a part for monitoring electric leakage or a short of the leakage current detecting elements C1 and C2; 2) a part for monitoring over-voltage of the power supply of IC1; 3) a part for monitoring under voltage of the power supply of IC1; and 4) a part for giving an indicator or tripping when either one or both of SCR1 and SCR2 are broken down.

Either electric leakage or short of C1 and C2 will cause the inputs of IC1 varying, resulting in an output from IC1, such that the tripping coil is powered and the main contact is disconnected. D3, D9, R11 and D2 together constitute a power supply over-voltage monitoring circuit, wherein D2 is lighted when the power supply voltage is higher than a set value, indicating an abnormal operation. D10, R13 and Q1 together constitute a power supply under voltage monitoring circuit, wherein D2 is lighted when the power supply voltage is lower than a set value, indicating an abnormal operation of the GFCI. The breakdown of the reset silicon controlled rectifier SCR1 or the tripping silicon controlled rectifier SCR2 will cause the coil to overheat, such that F1 will melt and the light-emitting diode D2 will light, indicating an abnormal operation. When SCR2 is broken down, the tripping coil is powered, the main contact is disconnected, and the loads are cut off. The output indicating lamp D1 turns off. In any case, if the main contact is disconnected, the output indicating lamp D1 will turn off. The detailed analysis is provided as follows.

Situation 1. In case of monitoring electric leakage and short of the leakage current detecting elements C1 and C2:

C1 and C2 are connected in series, with un-common ends connected to the detection coil L1 in parallel, equal to the situation that a capacitor with a capacity of half the capacity of C1 and C2 is connected with L1 in parallel. The common end of C1 and C2 is connected to the negative end of the power supply via the resistor R5 with large resistance. When electric leakage occurs at either or both of the capacitors C1 and C2, signals at the inputs of IC1 will vary and the voltage decrease, such that a control signal is output from the pin 5 of IC1. As a result, SCR2 and the tripping coil are powered, the main contact is disconnected to cut off the loads, and D1 turns off.

Situation 2. In case of the power supply over-voltage of IC1:

R11 and the cathode of D3 are connected in series. The anode of D3 and the anode of D9 are connected in series. The other terminal of R11 is connected to the power pin 6 of IC1. The cathode of D9 is connected to the anode of the light-emitting diode D2. The cathode of the light-emitting diode D2 is connected to the negative end of the power supply. When the supply voltage exceeds a rating value of D3, D9, D2 connected in series (which may be specific to IC), the light-emitting diode D2 is lighted. Because R10 is connected with the transistor Q1 in series, even Q1 turns on at this time, D2 can be lighted properly, indicating an abnormity of the power supply of IC1.

Situation 3. In case of the power supply under voltage of IC1:

The cathode of D10 is connected to the power pin of IC1, while the anode thereof is connected with the resistor R13 in series. The other terminal of the resistor R13 is connected to the base of the transistor for driving the transistor. If the supply power is in a normal state, i.e. higher than a sum of a voltage drop across D10 and a voltage between the base and emitter of the transistor (0.7V), the transistor Q1 turns on, to keep the voltage across the light-emitting diode D2 at about 0.3V, such that D2 will not illuminate. If the power supply voltage is too low, i.e. lower than the sum of the voltage drop across D10 and the voltage drop between the base and emitter of the transistor (0.7V), the transistor Q1 will turn off, and the power is supplied through R2, R2 and R10 to the anode of the light-emitting diode D2, such that the light-emitting diode D2 will illuminate. Because of inverse connection of D9, current will not flow through D9, D3, R11, and the pin 6 of IC1 to ground, indicating that the power supply voltage of IC1 is too low.

Situation 4. In case of breakdown of either or both of SCR1 and SCR2:

An indication is generated and tripping is performed. Breakdown of either or both of the elemental components SCR1 and SCR2 will cause the reset coil RELAY-1 and/or the tripping coil RELAY-2 to be powered for a long time, such that the coil will be overheated and the fuse F1 will melt, preventing the accident from escalating and preventing a potential fire from occurring. Meanwhile, because no current flows through the coil, the resistor R16 is connected in series in the whole main circuit, causing the power supplied to IC1 to significantly decrease. As analyzed in situation 3, the light-emitting diode D2 is lighted, indicating abnormity of the GFCI. However, only when SCR2 is broken down, the GFCI trips, the main contact is disconnected, and the loads are cut off. In case that RELAY-2 is continuously powered and heated, the fuse F1 is melted and the light-emitting diode D2 is illuminated.

The above embodiments are provided for the purpose of example only, and are not intended to limit the present invention. It is to be understood by those skilled in the art that there may be various modifications or replacements to the embodiments without departing from the scope and spirit of the present invention, and they shall fall into the scope defined by the appended claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A ground fault circuit interrupter (GFCI) control circuit giving an indicator or tripping at the end of life, comprising:
   main input lines that pass through a core around which an inductor is wound;
   a first capacitor and a second capacitor connected in series with each other, the first and second capacitors connected in parallel with the inductor;
   a common node between the first capacitor and the second capacitor, the common node connected to a negative end of a power supply via a first resistor;
   one end of the inductor connected to a first pin of a Single-Chip Microcomputer (SCM) via a third capacitor and a second resistor connected in series, and the other end of the inductor connected to a second pin of the SCM for detecting electric leakage;
   a third pin of the SCM connected to a third resistor, the third resistor connected to ground via a fourth capacitor for driving a first silicon controlled rectifier, the first silicon controlled rectifier connected in series with first, second, third and fourth diodes and a tripping relay;
   a power pin of the SCM connected to a cathode of a first Zener diode via a fourth resistor, an anode of the first Zener diode connected in series to an anode of a fifth diode;
   a cathode of the fifth diode connected to ground via an anode of a first light-emitting diode;
   the power pin of the SCM further connected to a cathode of a second Zener diode, an anode of the second Zener diode connected in series with a fifth resistor by an end of the fifth resistor, another end of the fifth resistor connected to a base of a transistor, the transistor having an emitter connected to the negative end of the power supply and a collector connected to the anode of the first light-emitting diode via a sixth resistor; and
   a reset circuit connected to the main power supply and connected in series with a switch via a fifth capacitor and a seventh resistor connected in parallel, another end of the switch connected to a control pin of a second silicon controlled rectifier, the control pin of the second silicon controlled rectifier connected in parallel with an eighth resistor and a sixth capacitor to form an instant trigger circuit, wherein the second silicon controlled rectifier is connected to a self-holding relay.

2. The GFCI control circuit according to claim 1, wherein an anode of the first silicon controlled rectifier is connected to a positive end of a bridge rectifier comprising the first, second, third and fourth diodes, a cathode of the first silicon controlled rectifier is connected to a negative end of the bridge rectifier comprising the first, second, third and fourth diodes, an AC input of the rectifying bridge is connected in series with the tripping relay by an end of the tripping relay, and another end of the tripping relay is connected to a phase line of the power supply.

3. The GFCI control circuit according to claim 1, wherein an end of an output neutral line is connected to an anode of a second light-emitting diode, a cathode of the second light-emitting diode is connected in series with a ninth resistor by an end of the ninth resistor, another end of the ninth resistor is connected to an anode of a sixth diode, and a cathode of the sixth diode is connected to an end of an output phase power supply line.

4. The GFCI control circuit according to claim 2, wherein an end of an output neutral line is connected to an anode of a second light-emitting diode, a cathode of the second light-emitting diode is connected in series with a ninth resistor by an end of the ninth resistor, another end of the ninth resistor is connected to an anode of a sixth diode, and a cathode of the sixth diode is connected to an end of an output phase power supply line.

* * * * *